United States Patent
Suess et al.

(10) Patent No.: US 12,014,558 B2
(45) Date of Patent: Jun. 18, 2024

(54) PRIVACY-PRESERVING IMAGE SENSOR

(71) Applicant: OMNIVISION TECHNOLOGIES, INC., Santa Clara, CA (US)

(72) Inventors: Andreas Suess, San Jose, CA (US); Bo Mu, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 126 days.

(21) Appl. No.: 17/976,648

(22) Filed: Oct. 28, 2022

(65) Prior Publication Data

US 2024/0144706 A1 May 2, 2024

(51) Int. Cl.
| | |
|---|---|
| *G06V 20/70* | (2022.01) |
| *G06V 10/25* | (2022.01) |
| *G06V 20/59* | (2022.01) |
| *G06V 40/18* | (2022.01) |
| *H04N 23/61* | (2023.01) |
| *H04N 23/80* | (2023.01) |
| *H04N 25/47* | (2023.01) |

(Continued)

(52) U.S. Cl.
CPC ............. *G06V 20/70* (2022.01); *G06V 10/25* (2022.01); *G06V 20/597* (2022.01); *G06V 40/18* (2022.01); *H04N 23/61* (2023.01); *H04N 23/80* (2023.01); *H04N 25/69* (2023.01); *H04N 25/78* (2023.01); *H04N 25/47* (2023.01); *H04N 25/75* (2023.01)

(58) Field of Classification Search
CPC ........ H04N 23/61; H04N 23/60; H04N 23/80; H04N 25/69; H04N 25/78; G06V 20/70; G06V 10/25
See application file for complete search history.

(56) References Cited

U.S. PATENT DOCUMENTS

| | | | |
|---|---|---|---|
| 10,819,904 B2* | 10/2020 | Jang | .................. G06F 21/36 |
| 2019/0268537 A1* | 8/2019 | Jang | ................... H04N 23/80 |
| 2022/0116513 A1 | 4/2022 | Kellerman et al. | |

FOREIGN PATENT DOCUMENTS

WO  2021/175714 A1  9/2021

OTHER PUBLICATIONS

Fontaine, R., "Huawei Leads Imaging Chip Area Arms Race, Sony Wins Big with i-ToF, Emergence of Event-Driven Vision Sensors," Imaging + Sensing End-of-Year Highlights, Dec. 18, 2019, 5 pages.

(Continued)

*Primary Examiner* — Nicholas G Giles
(74) *Attorney, Agent, or Firm* — Christensen O'Connor Johnson Kindness PLLC (57) ABSTRACT

In some embodiments, an image sensor is provided. A signal processing unit of the image sensor is configured with executable instructions that cause the signal processing unit to perform actions comprising: reading a captured scene from a pixel array; reading a value from a test initiation register; in response to determining that the value indicates a test mode: processing the captured scene to detect a region of interest associated with the value; and providing the region of interest to a first interface for transmission to a host device; and in response to determining that the value does not indicate the test mode: analyzing the captured scene using a computer vision technique to selectively generate a signal based on the analysis of the captured scene; and selectively providing the signal to a second interface for transmission to the host device.

24 Claims, 4 Drawing Sheets

(51) Int. Cl.
  *H04N 25/69*  (2023.01)
  *H04N 25/75*  (2023.01)
  *H04N 25/78*  (2023.01)

(56) References Cited

OTHER PUBLICATIONS

Rebecq, H., et al., "Events-to-Video: Bringing Modern Computer Vision to Event Cameras" IEEE Conference on Computer Vision and Pattern Recognition (CVPR), Long Beach, CA, 2019, 23 pages.
SmartThings Vision | GP-U999GTEEAAC | AU, https://www.samsung.com/au/smart-home/smartthings-vision-u999/GP-U999GTEEAAC/, retrieved on Nov. 17, 2022, 6 pages.

* cited by examiner

PRIVACY-PRESERVING IMAGE SENSOR

BACKGROUND INFORMATION

Field of the Disclosure

This disclosure relates generally to image sensors, and in particular but not exclusively, relates to image sensors used to detect objects.

Background Information

Growing numbers of uses have been found for image sensors that automatically detect objects. In an attempt to protect privacy of imaged subjects, event sensors have been developed that create a pixel response only if a significant change of information in the scene has been detected (e.g., a threshold number of pixels have had a luminance change of at least a threshold amount). As one example, this may occur if an object is moving in the captured scene, in which case the image sensor may function as an edge detector. However, several research attempts have been made illustrating that the image data produced by such event sensors, though limited, can nevertheless be used to reconstruct the appearance of imaged objects (such as the appearance of imaged persons), and are therefore not adequate to protect privacy.

What is desired are image sensors that can be used for automatically detecting objects while fully protecting the privacy of imaged subjects.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a signal processing unit is provided. The signal processing unit is configured to perform actions comprising: reading a captured scene from a pixel array; reading a value from a test initiation register; in response to determining that the value indicates a test mode: processing the captured scene to detect a region of interest associated with the value; and providing the region of interest to a first interface for transmission to a host device; and in response to determining that the value does not indicate the test mode: analyzing the captured scene using a computer vision technique to selectively generate a signal based on the analysis of the captured scene; and selectively providing the signal to a second interface for transmission to the host device.

In some embodiments, an image sensor is provided. The image sensor comprises a pixel array; a test initiation register; a signal processing unit communicatively coupled to the pixel array and the test initiation register; and one or more interfaces communicatively coupled to the test initiation register and the signal processing unit. The signal processing unit is configured with executable instructions that, in response to execution by the signal processing unit, cause the signal processing unit to perform actions comprising: reading a captured scene from the pixel array; reading a value from the test initiation register; in response to determining that the value indicates a test mode: processing the captured scene to detect a region of interest associated with the value; and providing the region of interest to a first interface of the one or more interfaces for transmission to a host device; and in response to determining that the value does not indicate the test mode: analyzing the captured scene using a computer vision technique to selectively generate a signal based on the analysis of the captured scene; and selectively providing the signal to a second interface of the one or more interfaces for transmission to the host device.

In some embodiments, a method is provided. A captured scene is read from a pixel array. A value is read from a test initiation register. In response to determining that the value indicates a test mode, the captured scene is processed to detect a region of interest associated with the value, and the region of interest is provided to a first interface for transmission to a host device. In response to determining that the value does not indicate the test mode, the captured scene is analyzed using a computer vision technique to selectively generate a signal based on the analysis of the captured scene, and the signal is selectively provided to a second interface for transmission to the host device.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In some embodiments of the present disclosure, an image sensor is provided that is configured to perform object detection and transmit signals based on detected objects without disclosing any image features to a host device. In order to improve reliability and manufacturability, in some embodiments the image sensor is configured to provide a test mode in which features of a predefined test image may be provided to the host device for calibration, but other image information is kept from being transmitted to the host device. This allows the image sensor to be effectively configured by a party that has possession of codewords that place the image sensor in the test mode (e.g., by the manufacturer of the image sensor) while still protecting private image features when not in the test mode.

Figure 1:
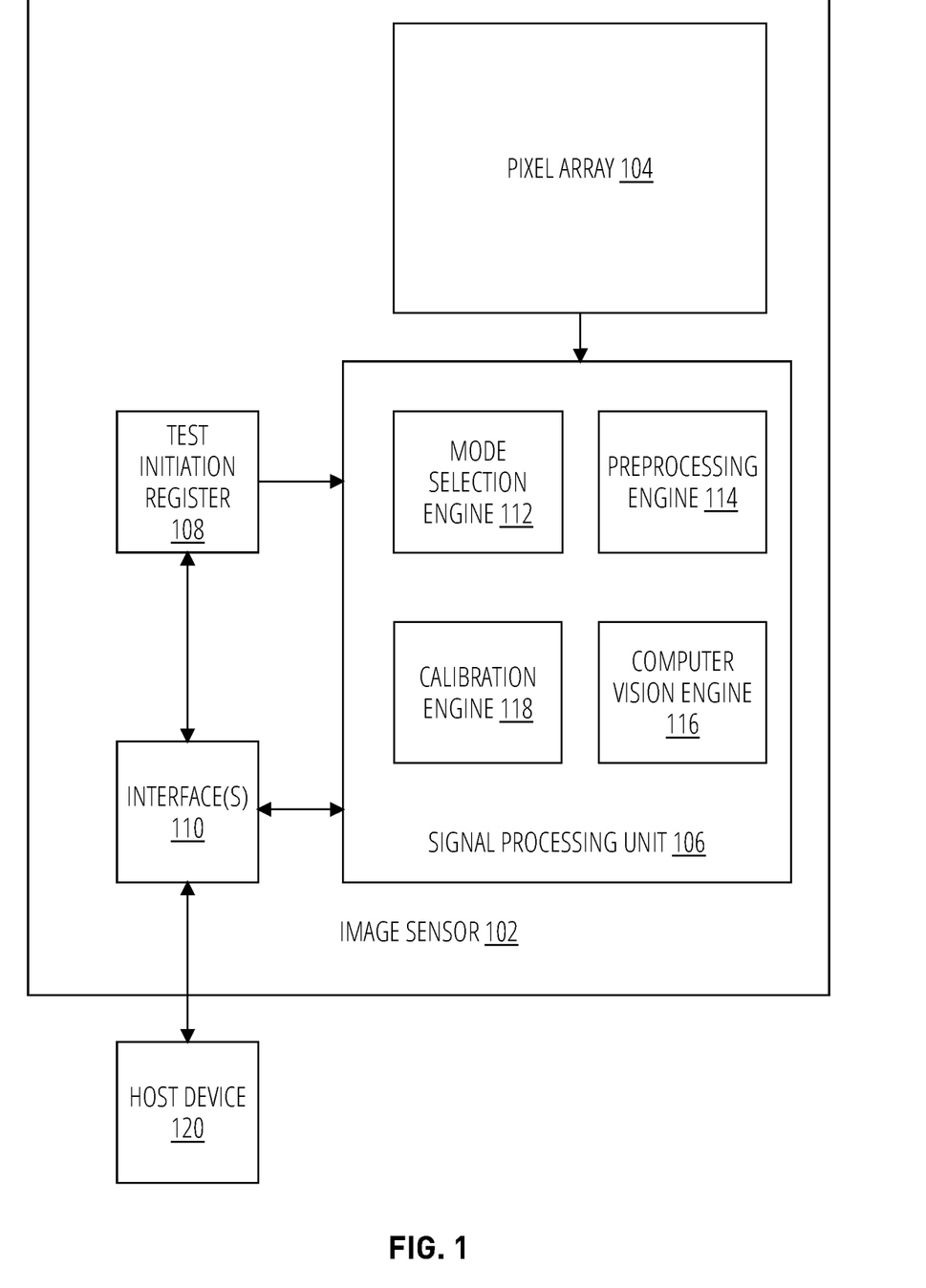
FIG. 1 is a block diagram of a non-limiting example embodiment of an image sensor according to various aspects of the present disclosure.

FIG. 1 is a block diagram of a non-limiting example embodiment of an image sensor according to various aspects of the present disclosure. As shown, the image sensor 102 includes a pixel array 104, a signal processing unit 106, one or more test initiation registers 108, and one or more interfaces 110.

The pixel array 104 may be any suitable collection of pixel sensors for image capture, including but not limited to photodiodes, event based sensors, CMOS sensors, and/or any other type of sensor typically used to capture images by detecting incident light. One of ordinary skill in the art will recognize that the pixel array 104 may include additional components, including but not limited to column and/or row control circuitry, lookup table circuitry, and/or other circuitry commonly used in pixel array applications. Since pixel array technology for image capture is known to those of ordinary skill in the art, further description of the pixel array 104 is not provided herein for the sake of brevity.

The pixel array 104 is communicatively coupled to the signal processing unit 106, a test initiation register 108, and one or more interfaces 110. In some embodiments, the test initiation register 108 may be a register included in a register bank of a memory unit in the image sensor 102 that is communicatively coupled to the signal processing unit 106. In some embodiments, the test initiation register 108 may be a register within the signal processing unit 106, instead of being a separate component as illustrated. Likewise, in some embodiments, one or more of the interfaces 110 may be incorporated into the signal processing unit 106 instead of being a separate component as illustrated.

In some embodiments, the signal processing unit 106 includes an application-specific integrated circuit (ASIC), a field-programmable gate array (FPGA), a general-purpose processor configured to execute computer-executable instructions stored on a non-transitory computer-readable medium, a special-purpose processor such as a graphics processing unit (GPU), a tensor processing unit (TPU), and/or any other type of processor configured to provide the described functionality.

As shown, the signal processing unit 106 is configured to provide a mode selection engine 112, a preprocessing engine 114, a calibration engine 118 and a computer vision engine 116. As used herein, "engine" refers to logic embodied in hardware or software instructions, which can be written in one or more programming languages, including but not limited to C, C++, C #, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

In some embodiments, the mode selection engine 112 is configured to read a value from the test initiation register 108, which may be written to the test initiation register 108 by the host device 120 via an interface 110. The mode selection engine 112 may then selectively place the signal processing unit 106 in a test mode or a private computer vision mode based on the value read from the test initiation register 108. In some embodiments, the preprocessing engine 114 is configured to perform various preprocessing operations on data read from the pixel array 104. In some embodiments, the calibration engine 118 is configured to perform various calibration operations based on data read from the pixel array 104 and an expected scene based on the value read from the test initiation register 108 by the mode selection engine 112. In some embodiments, the computer vision engine 116 is configured to perform computer vision operations based on data read from the pixel array 104, and to transmit signals to the host device 120 via one or more interfaces 110 without transmitting the data read from the pixel array 104.

Further description of the configuration of each of these components is provided below.

Figure 2:
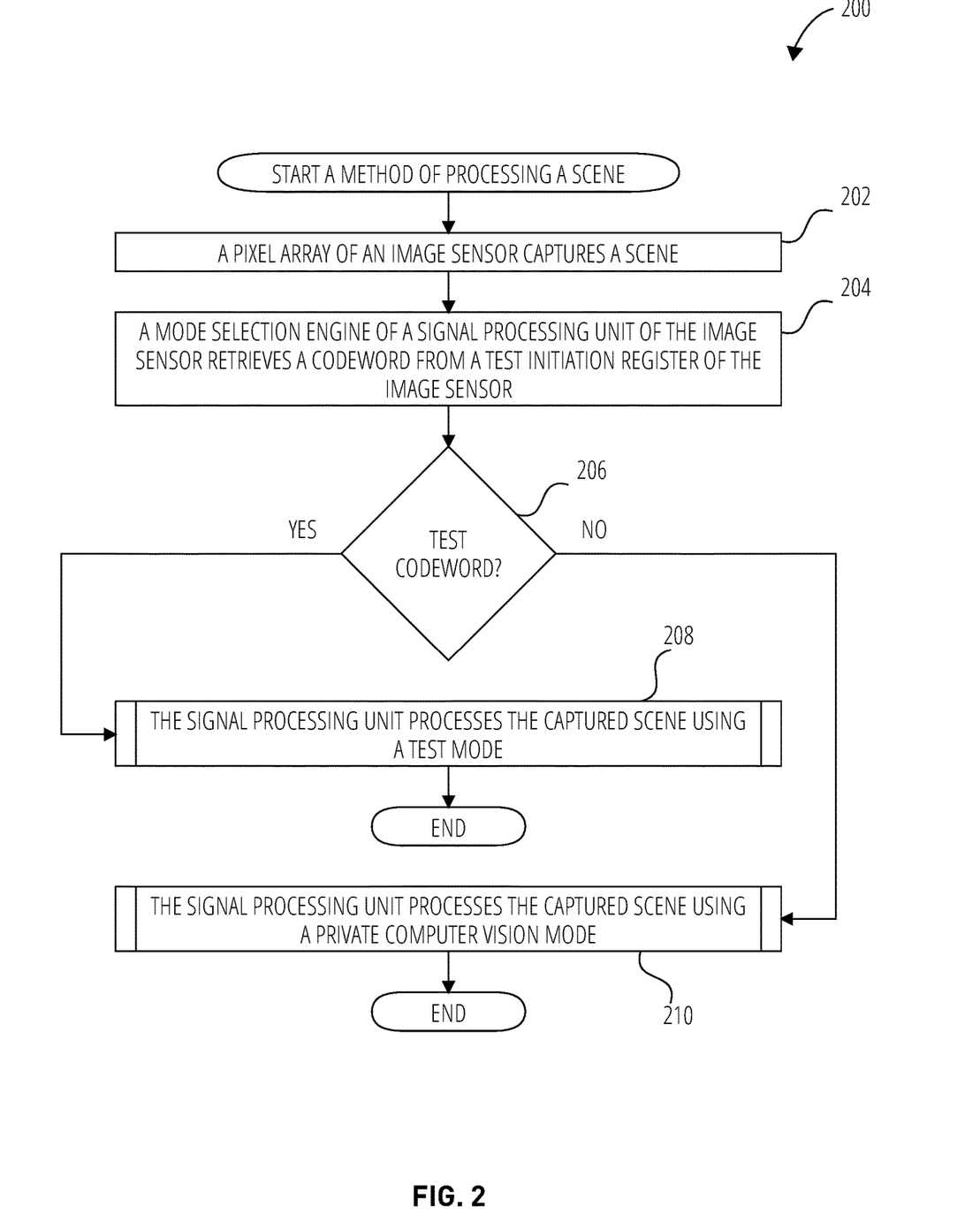
FIG. 2 is a flowchart that illustrates a non-limiting example embodiment of a method of processing a scene according to various aspects of the present disclosure.

FIG. 2 is a flowchart that illustrates a non-limiting example embodiment of a method of processing a scene according to various aspects of the present disclosure. In the method 200, a captured scene is processed in either a test mode in which limited areas of the captured scene may be provided to a host device 120, or a private computer vision mode in which the captured scene is processed internally by the signal processing unit 106 so that signals can be produced based on detected objects without providing any areas of the captured scene to the host device 120, thus ensuring privacy of the captured scene.

From a start block, the method 200 proceeds to block 202, where a pixel array 104 of an image sensor 102 captures a scene. Any suitable technique may be used to create the captured scene using the pixel array 104. For example, values may be read from the sensors of the pixel array 104, and the values may be combined into a grid of pixel values in order to create the captured scene. As another example, column controllers, row controllers, look-up tables, and signal processing techniques may be used to generate the captured scene from signals generated by the pixel array 104. Since techniques for creating a captured scene using a pixel array 104 are known to those of ordinary skill in the art, these techniques are not described further herein for the sake of brevity.

At block 204, a mode selection engine 112 of a signal processing unit 106 of the image sensor 102 retrieves a codeword from a test initiation register 108 of the image sensor 102. In some embodiments, the codeword may be written to the test initiation register 108 by the host device 120 via an interface 110, such as a serial interface. In some embodiments, the interface 110 by which the host device 120 writes the codeword to the test initiation register 108 may provide write-only access to the test initiation register 108, such that the host device 120 is unable to use the interface 110 to read the contents of the test initiation register 108 and the identity of the codewords can be obscured. Any suitable type of value may be used for the codeword, including but not limited to a string (such as a fixed-length string), a GUID, an integer value, or any other suitable type of value that is selected from a large enough value space to make it impractical to be guessed by the host device 120. In some embodiments, if no codeword has been written to the test initiation register 108 by the host device 120, the mode selection engine 112 may retrieve a null value or a default value from the test initiation register 108.

The method 200 then proceeds to decision block 206 where a determination is made regarding whether the image sensor 102 should operate in a test mode or a private computer vision mode based on the codeword retrieved from the test initiation register 108. In some embodiments, the mode selection engine 112 compares the codeword retrieved from the test initiation register 108 to a list of one or more valid codewords recognized by the mode selection engine 112. In some embodiments, the list of one or more valid codewords may be pre-stored in a memory unit of the image sensor 102. In some embodiments, the list of one or more valid codewords may be programmed into a one-time-programmable memory (OTP) unit of the image sensor 102. If it is determined that the retrieved codeword matches a codeword recognized by the mode selection engine 112, then the determination is that the image sensor 102 should operate in the test mode, and otherwise should operate in the private computer vision mode.

Figure 3:
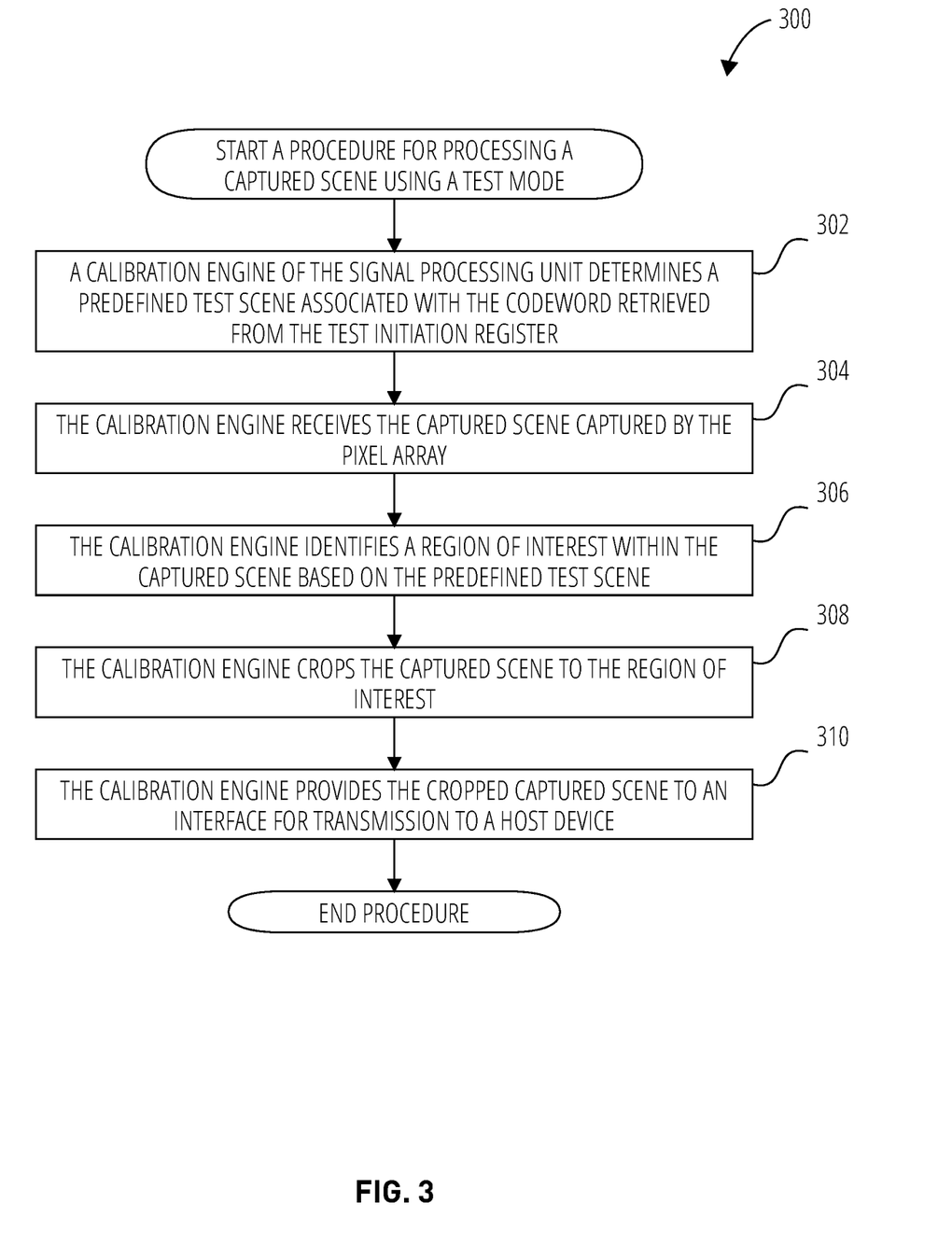
FIG. 3 is a flowchart that illustrates a non-limiting example embodiment of a procedure for processing a captured scene using a test mode according to various aspects of the present disclosure.

If the determination is that the image sensor 102 should operate in the test mode, then the result of decision block 206 is YES, and the method 200 proceeds to subroutine block 208, where a procedure is performed wherein the signal processing unit 106 processes the captured scene using a test mode. Any suitable procedure may be used at subroutine block 208, one non-limiting example of which is illustrated in FIG. 3 and described in further detail below. After executing the procedure at subroutine block 208, the method 200 proceeds to an end block and terminates.

Figure 4:
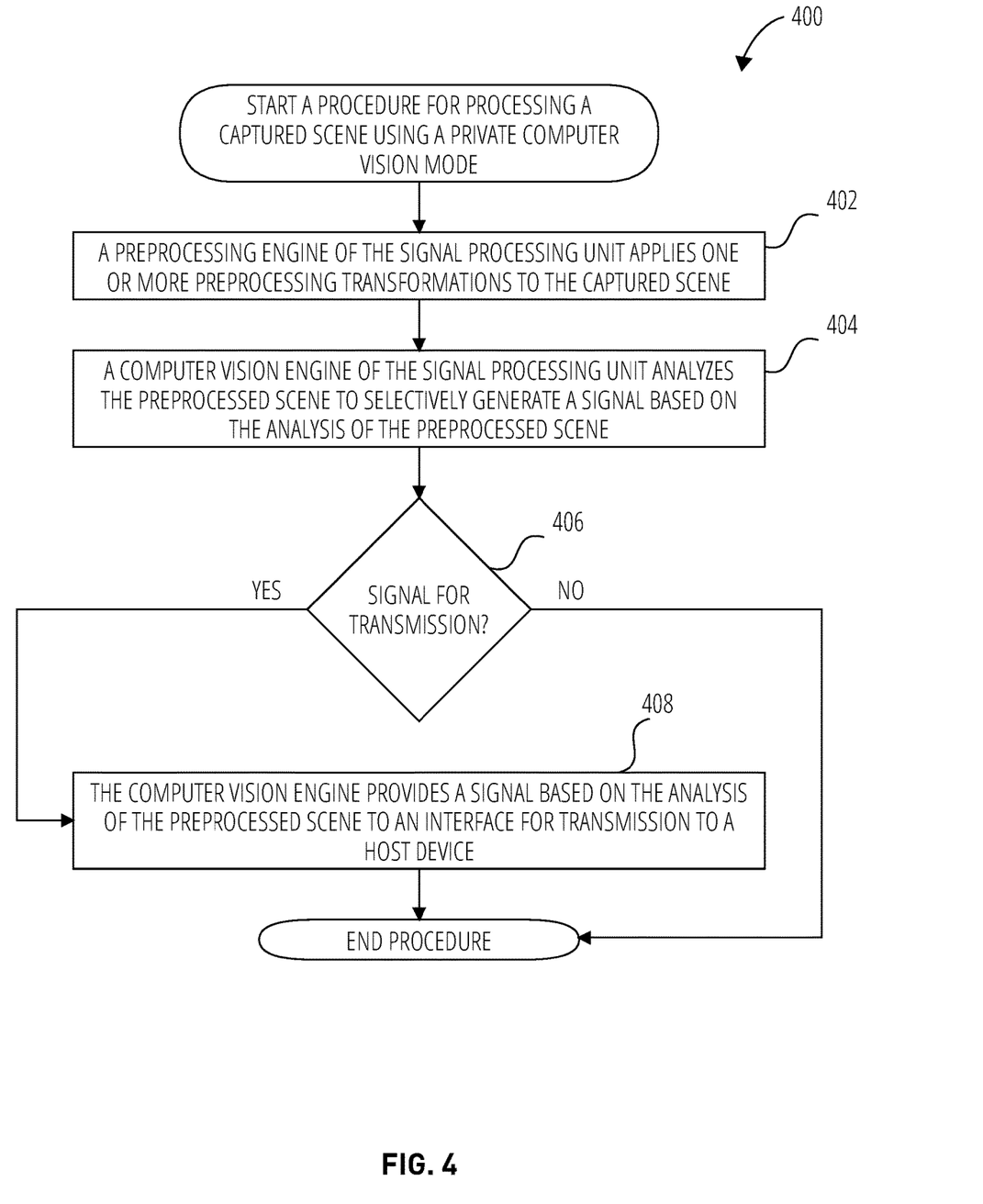
FIG. 4 is a flowchart that illustrates a non-limiting example embodiment of a procedure for processing a captured scene using a private computer vision mode according to various aspects of the present disclosure.

Returning to decision block 206, if it is not determined that the image sensor 102 should operate in the test mode, then the result of decision block 206 is NO, and the method 200 proceeds to subroutine block 210. At subroutine block 210, a procedure is performed wherein the signal processing unit 106 processes the captured scene using a private computer vision mode. Any suitable procedure may be used at subroutine block 210, one non-limiting example of which is illustrated in FIG. 4 and described in further detail below. After executing the procedure at subroutine block 210, the method 200 then proceeds to an end block and terminates.

Though the method 200 is illustrated in FIG. 2 as executing a single time, in some embodiments, the actions of the method 200 may be repeatedly performed, such as for multiple frames captured by the image sensor 102 over time. For example, depending on the type of host device 120, the signal processing unit 106 may continuously process captured scenes from the pixel array 104, and stream signals based on the processing of the private computer vision mode and/or the test mode to the host device 120 through the interface 110 (e.g., a serial interface such as an I2C interface, I3C interface, a serial peripheral interface (SPI), etc.).

In some embodiments, the host device 120 may be a testing equipment or a computer vision system programmed with testing software for the image sensor 102 that is configured to provide a codeword to the image sensor 102 through the interface 110 to drive the image sensor 102 operating in the test mode after the codeword is validated. In some embodiments, the host device 120 includes an input device (e.g., keypad, keyboard or touch panel) that enables one or more codewords to be inputted and written into the test initiation register 108 of the image sensor 102 thereafter through interface 110 (e.g., I2C or SPI) to cause the image sensor 102 to operate in the test mode after the one or more codewords received has been validated.

FIG. 3 is a flowchart that illustrates a non-limiting example embodiment of a procedure for processing a captured scene using a test mode according to various aspects of the present disclosure. In the test mode, limited types of image data are provided by the image sensor 102 to the host device 120 so that the image sensor 102 may be calibrated.

From a start block, the procedure 300 advances to block 302, where a calibration engine 118 of the signal processing unit 106 determines a predefined test scene associated with the codeword retrieved from the test initiation register 108. In some embodiments, the calibration engine 118 may retrieve the predefined test scene associated with the codeword from a computer-readable medium. The predefined test scene includes a pattern that is expected to be present in the captured scene. Typically, the pattern of the predefined test scene can be used to evaluate how well the image sensor 102 reproduces images, and the evaluation can be used to adjust settings of the image sensor 102 to improve the reproduction. Some examples of predefined test scenes include, but are not limited to, a flat field, a checkerboard pattern, a Macbeth chart, and test charts defined in ISO 12233 (e.g., resolution measurement charts). In some embodiments, a single predefined test scene may be used, such that a lookup of the predefined test scene based on the codeword is unnecessary, and the single predefined test scene may be retrieved in every case.

At block 304, the calibration engine 118 receives the captured scene captured by the pixel array 104. In some embodiments, the calibration engine 118 may receive the captured scene from a cache in which the captured scene is stored after being collected from the pixel array 104. In some embodiments, the calibration engine 118 may directly read the captured scene from the pixel array 104.

At block 306, the calibration engine 118 identifies a region of interest within the captured scene based on the predefined test scene. In some embodiments, the calibration engine 118 may use any suitable image comparison technique to compare the predefined test scene to the captured scene (or portions thereof), including but not limited to a strict comparison, a fuzzy pixel comparison, a correlation comparison, a classification using a convolutional neural network, and/or combinations thereof. Once the predefined test scene is found within the captured scene, the detected location of the predefined test scene in the captured scene is identified as the region of interest. In some embodiments, a predefined limited portion of the predefined test scene (e.g., a limited portion of a standard test chart) may be identified as the region of interest.

At block 308, the calibration engine 118 crops the captured scene to the region of interest, and at block 310, the calibration engine 118 provides the cropped captured scene (i.e., the region of interest from the captured scene without other portions of the captured scene) to an interface 110 for transmission to a host device 120. In some embodiments, the interface 110 for transmission of the cropped captured scene is a standard image interface, one non-limiting example of which is a mobile industry processor interface (MIPI).

In some embodiments, if the predefined test scene is not found in the captured scene or if a portion of the predefined test scene is occluded by an intervening object or is otherwise not fully visible, the calibration engine 118 may not identify any region of interest and the procedure 300 may terminate without providing any scene to the interface 110 for transmission to the host device 120. In this way, privacy is further protected because even if the codewords are somehow obtained and provided to the image sensor 102 by a malicious user, the image sensor 102 does not provide all captured scenes to the host device 120, but instead only provides regions of interest from the predefined test scenes.

The procedure 300 then advances to an end block and returns control to its caller. Once the host device 120 has the cropped captured scene, the cropped captured scene can be used for any reason. As one non-limiting example, the cropped captured scene may be analyzed as part of an inspection process to determine whether the image sensor 102 was manufactured properly. As another non-limiting example, the cropped captured scene may be analyzed to determine whether calibration settings, preprocessing actions, optical focus settings, or other settings of the image sensor 102 should be changed to improve the quality of the captured scenes. As yet another non-limiting example, the cropped captured scene may be used while training a machine learning model to be used by the image sensor 102 so that imperfections in the captured scene may be trained around.

FIG. 4 is a flowchart that illustrates a non-limiting example embodiment of a procedure for processing a captured scene using a private computer vision mode according to various aspects of the present disclosure. In the procedure 400, the image sensor 102 uses computer vision techniques to process the captured scene and provides a signal indicating a result of the processing to the host device 120 without providing the captured scene itself, thus ensuring that privacy is protected.

From a start block, the procedure 400 advances to block 402, a preprocessing engine 114 of the signal processing unit 106 applies one or more preprocessing transformations to the captured scene. Any suitable type of preprocessing transformation may be performed, including but not limited to one or more of black level correction, defect pixel correction, resampling, denoising, coordinate and/or image transformation, interpolation, normalizing, and binning.

At block 404, a computer vision engine 116 of the signal processing unit 106 analyzes the preprocessed scene to selectively generate a signal based on the analysis of the preprocessed scene. In some embodiments, the computer vision engine 116 is configured to generate the signal based on a detection of an object or a predetermined object. In some embodiments, when the computer vision engine 116 detects no object in the preprocessed scene, the computer vision engine 116 may select to generate a signal indicating that no object was found. In some embodiments, when no object is detected in the process scene, the computer vision engine 116 may select to skip the generation of the signal.

In some embodiments, selectively generating the signal based on the analysis of the preprocessed scene includes assigning at least one label for each object detected in the preprocessed scene. The labels may include locations of the labeled objects and information (including but not limited to object types) of the labeled objects as discussed further below. Any suitable type of computer vision technique may be used by the computer vision engine 116 to label objects within the captured scene, including but not limited to feature or pattern recognition algorithms that include, but are not limited to, K-means clustering techniques, Bayesian techniques, principal component analysis (PCA) techniques, linear discriminant analysis (LDA) techniques, support vector machine (SVM) techniques, artificial neural network (ANN) techniques, convolutional neural network (CNN) techniques, and spiking neural network (SNN) techniques. In some embodiments, the techniques may use trained models that are stored in a computer-readable medium within the image sensor 102 that is accessible by the computer vision engine 116.

The procedure 400 then advances to decision block 406, where a determination is made based on whether a signal has been generated by the computer vision engine 116 for transmission to the host device 120. In some embodiments, the output of the analysis in block 404 may be a signal including labels indicating types of objects detected (i.e., classification of objects detected), a signal indicating whether or not a predetermined type of object was detected, or a signal indicating that no objects were detected, and the determination at decision block 406 may be made based on this output. For example, in some embodiments, the analysis in block 404 may label a variety of objects in the preprocessed scene with classifications (e.g., humans, animals, cars, surfaces, furniture, etc.), and the determination at decision block 406 may check whether a predetermined object type (e.g., a human) was labeled. In some embodiments, the computer vision engine 116 of the signal processing unit 106 may compare the labels generated by the computer vision engine 116 to one or more predetermined types stored in a look-up table. In some embodiments, the look-up table may be programmed in the OTP unit in the image sensor 102. In some embodiments, the labels generated by the computer vision engine 116 at block 404 may include additional information about the labeled objects other than just a type of object, including but not limited to one or more of an identity of a human, a biometric characteristic of a human, a pose of a human, or a gesture being performed by a human.

If the determination at decision block 406 is that there is no signal to be transmitted to the host device 120, then the result of decision block 406 is NO, and the procedure 400 advances to an end block to return control to its caller without transmitting a signal to the host device 120. Otherwise, if the determination at decision block 406 is that there is a signal to be transmitted to the host device 120, then the result of decision block 406 is YES, and the procedure 400 advances to block 408. At block 408, the computer vision engine 116 provides a signal based on the analysis of the preprocessed scene to an interface 110 for transmission to a host device 120. In some embodiments, the signal may include one or more labels containing information about objects detected in the preprocessed scene. In some embodiments, the signal may indicate a presence of any object detected in the preprocessed scene. In some embodiments, the signal may indicate that no objects were detected in the preprocessed scene. In some embodiments, a look-up table may be configured to include a list of values, each corresponding to a type of object, a status of an object and/or another suitable characteristic of an object such that the computer vision engine 116 may provide the value from the look-up table as the signal for a specific detected object.

The type of predetermined object detected and the signal generated may vary widely based on the type of host device 120 and the application for the image sensor 102. One non-limiting example type of host device 120 is an intelligent switch (including but not limited to a light switch). The intelligent switch may be configured to turn on if a human is detected within the captured scene or is detected as entering the captured scene, and to turn off if no human is detected (e.g., a dog or cat is detected) within the captured scene or is detected as leaving the captured scene. In these example embodiments, the type of predetermined object may be a human, labelling for the type of predetermined object may be human or non-human, the location of the human, and the characteristic of the human, and the signal may indicate a presence or absence of a human in the captured scene, and/or may indicate whether a human is entering or leaving the captured scene. In some embodiments, the signal may indicate a location of a detected human in the captured scene, a gesture made by the human detected, a pose of a detected human or a movement of a detected human in the captured scene, or other attributes of the detected human in the captured scene.

The host device 120 (e.g., the intelligent switch) may then use the signal from the image sensor 102 as an input to logic that alters the state of the switch. In some embodiments, the image sensor 102 may operate to constantly capture a scene for the computer vision engine 116 to analyze and label one or more objects detected to constantly stream the signal to the host device 120 or for the host device 120 to configure the state of the switch. In some embodiments, the computer vision engine 116 may recognize multiple different types of objects in the captured scene (e.g., human, dog, ball, vehicle, etc.), and the signal may indicate the type of object that was detected. In such embodiments, the host device 120 may choose whether or not to change the state of the switch based on the type of object detected. In some embodiments, the computer vision engine 116 may recognize no object is in the captured scene, and the signal may indicate no object was detected or indicate no presence of predetermined object. In such embodiments, the host device 120 may control the switch to operate in a cut-off or power-off state to save power.

Another non-limiting example of a host device 120 is an augmented reality (AR) system, a virtual reality (VR) system, a mixed reality (MR) system, or other system that uses eye tracking information. In such systems, the type of predetermined object may be one or more pupils of one or more eyes within the captured scene. By determining the location and/or size of the one or more pupils within the captured scene, various information can be determined, including but not limited to a gaze location, a vergence measurement, an accommodation measurement, and an amount of pupil dilation. In some embodiments, the computer vision engine 116 of the image sensor 102 may analyze one or more pupils of one or more eyes within the captured scene and generate labels for the pupils of one or more eyes detected based on associated measurement of the location, size, and/or gaze direction. In some embodiments, the location and/or size of the pupil(s) may be provided in the signal transmitted to the host device 120, and the host device 120 may use the location and/or size of the pupil(s) to derive the gaze/vergence/accommodation/dilation status information. In some embodiments, the processing performed by the image sensor 102 may include the derivation of the gaze/vergence/accommodation/dilation status information, and this status information may be provided in the signal transmitted to the host device 120. The host device 120 may then use the status information for any suitable reason, including but not limited to focus adjustment, gaze-contingent rendering, interface control, and/or attention recording.

Yet another non-limiting example of a host device 120 is a user monitoring system, such as a driver monitoring system for an automobile. In such systems, the type of predetermined object may include one or more facial landmarks, limbs, joints, or other bodily features or keypoints. The detection of these predetermined objects may then be used to determine a skeleton model and/or a facial model of the person which may then in turn be used for gaze detection, mental state detection (e.g., drowsiness detection, alertness detection, intoxication detection, etc.), physical condition, or biometric detection (e.g., face recognition or iris detection, etc.) or determining any other characteristic of the person. In some embodiments, the computer vision engine 116 of the signal processing unit 106 in the image sensor 102 labels predetermined objects based on object detection to provide indications on the predetermined objects detected such as labelled with attentive or drowsiness, level of alertness, gaze direction and/or, biometric information etc., and encode the labels for the predetermined objects in the signal to be transmitted to the host device 120, accordingly. Once the characteristic is determined, the host device 120 can take an appropriate action, including but not limited to one or more of presenting an alert in response to detecting drowsiness or inattention, operating an interface based on the gaze direction, or enable or disable a driving system of the automobile. In some embodiments, the signal may be encoded to include information on type of object (e.g., human or non-human), characteristic or classification (e.g., attentive or drowsy) and/or measurement result (e.g. gaze direction or pupil size), and the signal may be transmitted to the host device 120 through a serial interface such as I2C, I3C, SPI. The host device 120 may take an action based on the signal e.g., make an alert sound or display as a warning message on a display to alert the driver. In some embodiments, the signal transmitted to the host device 120 may represent the skeleton model, facial model, and/or other image characteristics determined by the computer vision engine 116. In some embodiments, the computer vision engine 116 may determine the characteristic of the person and provide the characteristic (e.g., associated with one or more labels or classifications) in the signal transmitted to the host device 120 so that the privacy of the imaged person may be further protected.

Any suitable type of interface 110 may be used to transmit the signal to the host device 120. In some embodiments, a serial interface such as an I2C interface, I3C interface, a serial peripheral interface (SPI) may be used. In some embodiments, an MIPI interface such as MIPI camera serial interface (CSI) may be used. In some embodiments, the transmission of the signal may cause an interrupt to be generated, such that the detection of the object by the image sensor 102 can trigger action to be taken by the host device 120 without the host device 120 having to query the image sensor 102 for the detected state. For example, the image sensor 102 may output the signal in form of a trigger signal through a corresponding serial interface to the host device 120 and cause the host device 120 to control an operation of a device such as turn a light switch on or off, turn an electrical appliance to on or off, or turn on/off an alarm, etc. In some embodiments, the image sensor 102 may output the signal in a form that it writes as a value into a register or other computer-readable medium that the host device 120 can query via the interface 110 (e.g., I2C, I3C, or SPI interface) in order to obtain the signal or the information for the detected object conveyed in the signal.

The procedure 400 then advances to an end block and returns control to its caller.

While illustrative embodiments have been illustrated and described, it will be appreciated that various changes can be made therein without departing from the spirit and scope of the invention.

The embodiments of the invention in which an exclusive property or privilege is claimed are defined as follows:

1. A signal processing unit configured to perform actions comprising:
    reading a captured scene from a pixel array;
    reading a value from a test initiation register;
    in response to determining that the value indicates a test mode:
        processing the captured scene to detect a region of interest associated with the value; and
        providing the region of interest to a first interface for transmission to a host device; and
    in response to determining that the value does not indicate the test mode:
        analyzing the captured scene using a computer vision technique to selectively generate a signal based on the analysis of the captured scene; and
        selectively providing the signal to a second interface for transmission to the host device.

2. The signal processing unit of claim 1, wherein processing the captured scene to detect the region of interest includes:
    determining a predefined test scene associated with the value;
    detecting the predefined test scene in the captured scene; and cropping the captured scene to a region of interest associated with the predefined test scene.

3. The signal processing unit of claim 1, wherein selectively generating the signal based on the analysis of the captured scene includes generating the signal based on a detection of a predetermined object in the captured scene.

4. The signal processing unit of claim 1, wherein analyzing the captured scene using the computer vision technique to selectively generate the signal based on the analysis of the captured scene includes:
   assigning at least one label for at least one object detected in the captured scene; and
   selectively generating the signal based on the at least one label.

5. The signal processing unit of claim 4, wherein selectively providing the signal to the second interface for transmission to the host device includes at least one of:
   selectively transmitting a trigger signal to the host device through the second interface based on whether a predetermined object is indicated by the at least one label; or
   writing a value based on the at least one label to a register to be queried by the host device through the second interface.

6. The signal processing unit of claim 4, wherein the signal based on the at least one label indicates at least one of a type of the object detected, a gesture of the object detected, a movement of the object detected, or a location of the object detected.

7. The signal processing unit of claim 4, wherein the at least one object is a human, and wherein the signal based on the labels indicates a mental state of the human.

8. An image sensor, comprising:
   a pixel array;
   a test initiation register;
   a signal processing unit communicatively coupled to the pixel array and the test initiation register; and
   one or more interfaces communicatively coupled to the test initiation register and the signal processing unit;
   wherein the signal processing unit is configured with executable instructions that, in response to execution by the signal processing unit, cause the signal processing unit to perform actions comprising:
      reading a captured scene from the pixel array;
      reading a value from the test initiation register;
      in response to determining that the value indicates a test mode:
         processing the captured scene to detect a region of interest associated with the value; and
         providing the region of interest to a first interface of the one or more interfaces for transmission to a host device; and
      in response to determining that the value does not indicate the test mode:
         analyzing the captured scene using a computer vision technique to selectively generate a signal based on the analysis of the captured scene; and
         selectively providing the signal to a second interface of the one or more interfaces for transmission to the host device.

9. The image sensor of claim 8, wherein processing the captured scene to detect the region of interest includes:
   determining a predefined test scene associated with the value;
   detecting the predefined test scene in the captured scene; and
   cropping the captured scene to a region of interest associated with the predefined test scene.

10. The image sensor of claim 8, wherein selectively generating the signal based on the analysis of the captured scene includes generating the signal based on a detection of a predetermined object in the captured scene.

11. The image sensor of claim 8, wherein analyzing the captured scene using the computer vision technique to selectively generate the signal based on the analysis of the captured scene includes:
   assigning at least one label for at least one object detected in the captured scene; and
   selectively generating the signal based on the at least one label.

12. The image sensor of claim 11, wherein selectively providing the signal to the second interface of the one or more interfaces for transmission to the host device includes at least one of:
   selectively transmitting a trigger signal to the host device through the second interface based on whether a predetermined object is indicated by the at least one label; or
   writing a value based on the at least one label to a register to be queried by the host device through the second interface.

13. The image sensor of claim 11, wherein the signal based on the at least one label indicates at least one of a type of the object detected, a gesture of the object detected, a movement of the object detected, or a location of the object detected.

14. The image sensor of claim 13, wherein the host device is an intelligent switch, and wherein the type of the object detected indicates whether the object is a human or whether the object is non-human.

15. The image sensor of claim 11, wherein the host device is an augmented reality system, a virtual reality system, or a mixed reality system, and wherein the object detected is a pupil of an eye.

16. The image sensor of claim 11, wherein the object detected is a human, and wherein selectively generating the signal based on the at least one label includes generating a signal that indicates a mental state of the human or a biometric characteristic of the human.

17. The image sensor of claim 16, wherein the host device is a driver monitoring system.

18. A method, comprising:
   reading a captured scene from a pixel array;
   reading a value from a test initiation register;
   in response to determining that the value indicates a test mode:
      processing the captured scene to detect a region of interest associated with the value; and
      providing the region of interest to a first interface for transmission to a host device; and
   in response to determining that the value does not indicate the test mode:
      analyzing the captured scene using a computer vision technique to selectively generate a signal based on the analysis of the captured scene; and
      selectively providing the signal to a second interface for transmission to the host device.

19. The method of claim 18, wherein processing the captured scene to detect the region of interest includes:
   determining a predefined test scene associated with the value;
   detecting the predefined test scene in the captured scene; and cropping the captured scene to a region of interest associated with the predefined test scene.

20. The method of claim 18, wherein selectively generating the signal based on the analysis of the captured scene includes generating the signal based on a detection of a predetermined object in the captured scene.

21. The method of claim 18, wherein analyzing the captured scene using the computer vision technique to selectively generate the signal based on the analysis of the captured scene includes:
   assigning at least one label for at least one object detected in the captured scene; and
   selectively generating the signal based on the at least one label.

22. The method of claim 21, wherein providing the signal based on the at least one label to the second interface for transmission to the host device includes at least one of:
   selectively transmitting a trigger signal to the host device through the second interface based on whether a predetermined object is indicated by the at least one label; or
   writing a value based on the at least one label to a register to be queried by the host device through the second interface.

23. The method of claim 21, wherein the signal based on the at least one label indicates at least one of a type of the object detected, a gesture of the object detected, a movement of the object detected, or a location of the object detected.

24. The method of claim 21, wherein the object detected is a human, and wherein the signal based on the at least one label indicates a mental state of the human or a biometric characteristic of the human.

\* \* \* \* \*